Aug. 26, 1930.  W. JONES  1,774,144
SHOCK ABSORBER
Filed May 22, 1928    2 Sheets-Sheet 2

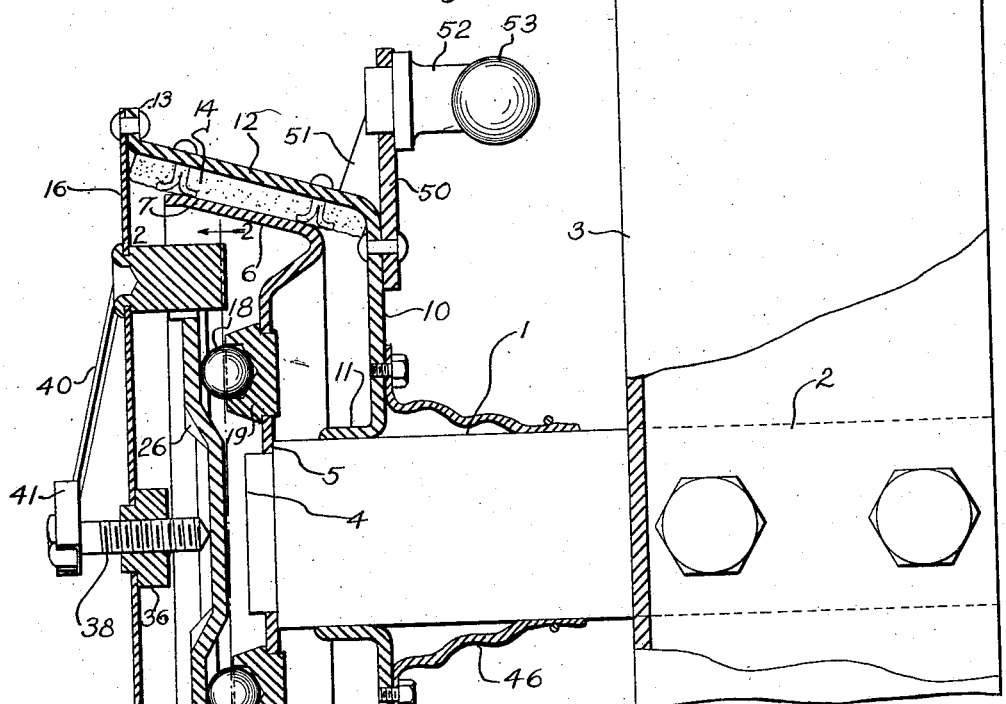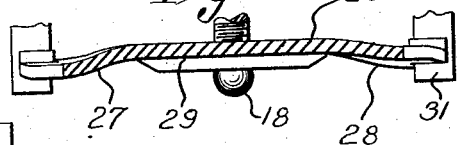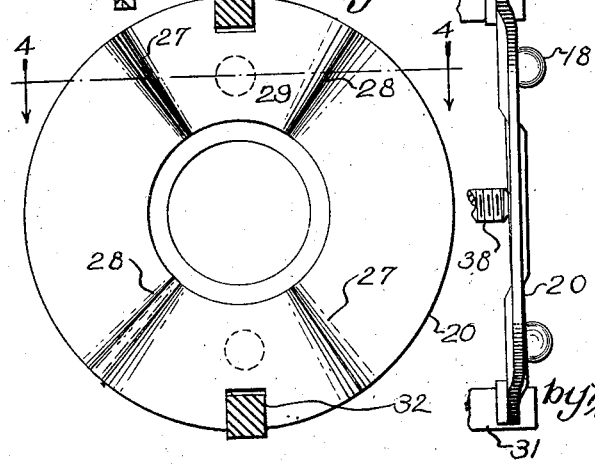

Inventor:
Webster Jones
by Roberts Cushman & Woodberry
Attys.

Patented Aug. 26, 1930

1,774,144

UNITED STATES PATENT OFFICE

WEBSTER JONES, OF WEST NEWTON, MASSACHUSETTS

SHOCK ABSORBER

Application filed May 22, 1928. Serial No. 279,670.

This invention relates to an improved shock absorbing device particularly adapted for use upon land vehicles, although being adapted to general application where it is desired to dampen the relative movement between parts.

The shock absorber provided by the present invention preferably is adapted to permit free movement of the vehicle spring when the axle is at its normal distance from the chassis frame, while opposing movement of the axle in relation to the frame at either side of the normal position. Thus a vehicle equipped with shock absorbers of this type is adapted to ride over minor irregularities without being appreciably affected by the shock absorber, while major movements of the axle in either direction in relation to the chassis frame may be retarded with progressively increasing resistance, this dampening action continuing as the axle and frame return to their normal relation to each other but decreasing as this effect takes place. It is thus evident that devices of this character are effective in opposing and absorbing shocks of major amplitude in either direction and in counteracting the effect of the inertia of the relatively movable parts, while avoiding preloading or stiffening of the spring action under normal conditions of load and shock.

In its preferred embodiment, the present device is arranged to have the moving and wearing parts thereof enclosed and protected from dust, mud, and moisture, thereby avoiding rapid wear and deterioration of the parts and ensuring the continued smooth and effective operation of the device. Furthermore, the device is preferably provided with anti-friction means permitting the free movement of the parts when the vehicle spring and axle are substantially at their normal distance from each other or within the intermediate range of their movement, so that the shock absorbing device does not hamper or dampen the action of the vehicle spring under these conditions. Since a device of this character is adapted to oppose movement of the axle in relation to the chassis frame in either direction, it is particularly effective in opposing the tendency of the frame to tip when the vehicle is turning corners.

The preferred structural embodiment of the invention includes a plurality of sheet metal stampings which permit the device to be economically manufactured and which may be so arranged that the friction surfaces which tend to absorb the shock may be readily cooled. A device of this character preferably is provided with readily accessible and easily operable adjusting means whereby the effective opposition of the shock absorber to shocks may be varied to suit individual installations and the desires of the particular user, as well as to compensate for wear.

Objects of the invention, among others, are to provide a simple, compact, inexpensive shock absorber of the friction type which will not necessarily hamper the action of the vehicle spring when the axle and frame are substantially at their normal distance from each other and which may dampen and retard movement of these members in either direction when they pass out of their normal positions in relation to each other.

In the drawings,

Fig. 1 is a horizontal sectional view of a portion of the shock absorbing device;

Fig. 2 is a side elevational view of the cam plate of the same and related parts;

Fig. 3 is an edge view of the plate shown in Fig. 2;

Fig. 4 is a section on line 4—4 of Fig. 3;

Figure 5:
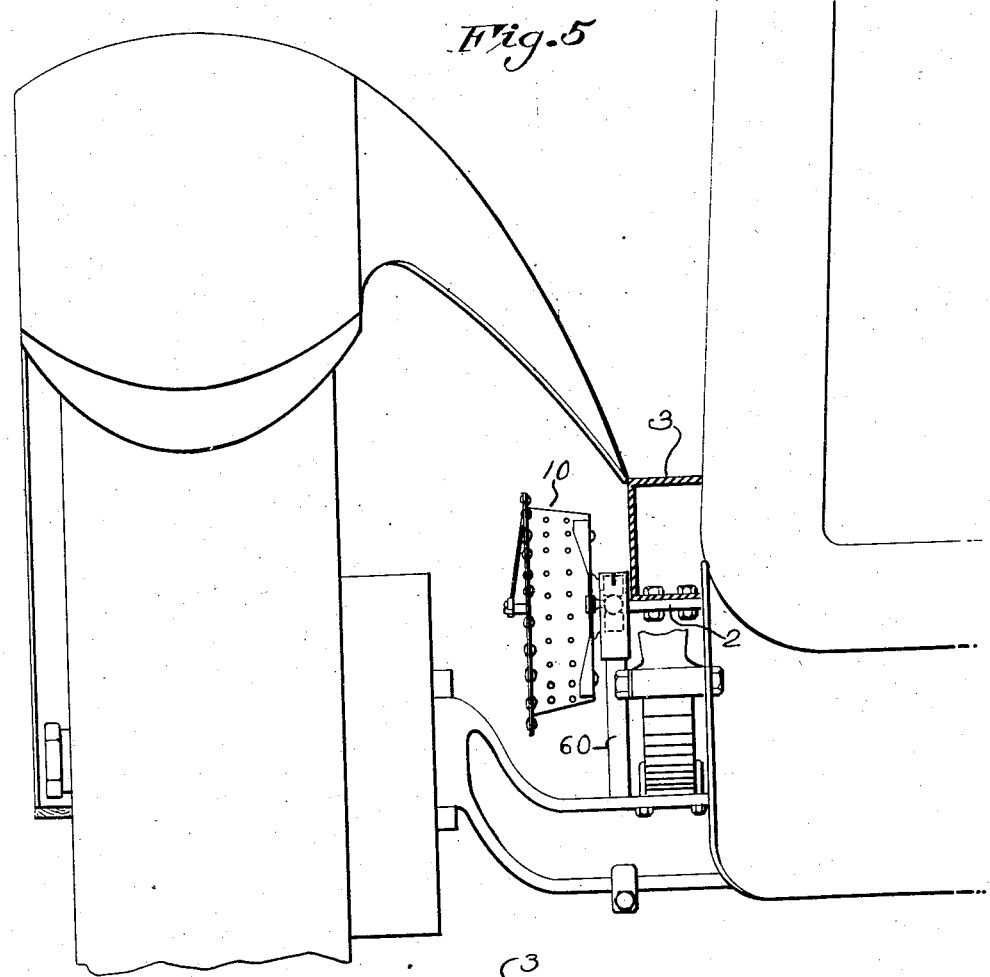
Fig. 5 is a view of a portion of a motor vehicle showing the manner in which my improved shock absorber may be applied to the same.

Referring to the accompanying drawings, and more particularly to Fig. 1 thereof, it may be seen that my improved shock absorber comprises an inner hub member 1 which may be in the form of a bar having an end portion 2 cut away to provide a flattened surface which may be secured to a convenient point upon the vehicle chassis, such as the bottom of a frame channel 3. The outer end of member 1 is provided with an extension 4 of reduced diameter which defines an annular shoulder 5. Secured against the latter is an inner brake member 6, which may comprise a sheet metal stamping which is welded or otherwise secured to support 1 and which has a frusto-conical friction surface provided by a suitable peripheral flange 7. It is thus evident that the member 6 is secured in fixed relation to the chassis frame. Enclosing this member is an outer shell 10 which may also be formed of sheet material and which has a suitable upset boss 11 forming a bearing and fitting upon the circular portion of support 1. Member 10 includes a suitable frusto-conical portion 12 and an outer annular flange 13. The inner surface of portion 12 preferably carries a suitable friction lining 14 which may be of leather, ordinary brake lining, or any desired material.

Secured to the flange 13 by rivets 15 or any similar fastening means is a resilient annular plate 16. Thus, members 10 and 16 together serve substantially to enclose member 6 and to protect the engaging surfaces of flange 7 and friction material 14 which provide a cone or brake at this point. Member 6 may carry a plurality, for example a pair, of anti-friction members, such as balls 18, which are received in suitable pockets in the metal blocks 19 that are welded or otherwise secured to member 6. The cam plate 20, which is shown more particularly in Figs. 2, 3 and 4, is designed to ride upon and press against balls 18. This plate may be formed of sheet metal and has diametrically opposed pairs of cam surfaces 27 and 28, respectively. The surfaces 27 and 28 at each side of the plate are preferably spaced by substantially flat surfaces 29 each of which is engaged by one of the balls 18 when the parts are in their normal position corresponding to the ordinary spacing of the axle from the frame (Fig. 4).

The spring plate or diaphragm 16 carries a pair of blocks 30 which have extensions 31 adapted to engage opposed non-circular notches 32 in cam plate 20, whereby the plate may slide inwardly and outwardly in relation to the diaphragm 16 but is prevented from rotating in relation to the same. Blocks 30 may be secured to the diaphragm in any desired manner. As shown, the outer ends of these blocks are drilled and riveted over as designated by numeral 34.

A suitable nut 36 is secured to the central portion of spring disk 16 by welding or any other appropriate means and receives an adjusting screw 38, the inner end of which bears against the central portion of cam plate 26. A suitable retaining member 40 is provided to engage the head of screw 38 normally to prevent rotation of the same in relation to nut 36. For this purpose member 40 may have one end secured to the periphery of plate 16 and to flange 13 and may have a resilient body portion carrying parallel flanges 41 which are adapted to engage opposite faces of the cap screw 38. These flanges and the cap screw preferably are so dimensioned that the resilient arm of member 40 may be pressed inwardly to disengage the flanges from the head of the screw to permit the same to be adjusted.

Any suitable boot 46 of leather or the like may be arranged about the boss 11 to prevent entrance of moisture or dirt between this member and bar 1.

Figure 6:
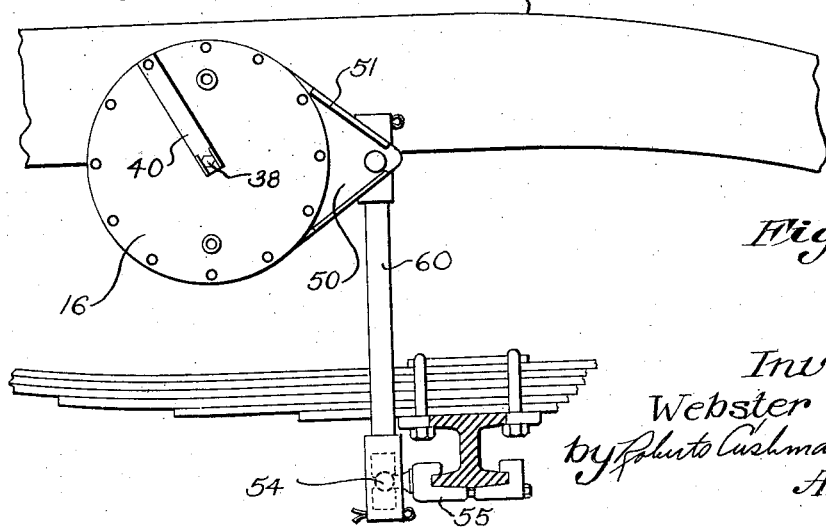
Fig. 6 is a view partly in section and partly in side elevation of the assembly shown in Fig. 5.

Secured to the outer surface of shell 10 is a bracket 50 which may comprise a pressed metal plate secured to the flat surface of shell 10 and having marginal reinforcing flanges 51. This bracket carries a stud 52 which may be welded or otherwise secured thereto, a hardened ball 53 being located at the outer end of pin 52. A connecting rod 60 connects ball 53 and hence shell 10 with the axle. This connecting rod may have end portions providing sockets to receive the ball 53 and a similar ball 54 which is carried by the axle; the latter, for example, may be welded to the spring clip, to the axle itself or to a clamp 55 which is secured to the axle as shown in Fig. 6. It is evident that the connecting rod 60 may be provided with suitable means to compensate for wear between the sockets and balls.

As shown in Fig. 6, the connecting rod may preferably be arranged to extend substantially vertically between the frame and axle, when these parts are in their normal relation to each other, thus permitting a comparatively large range of movement of the relatively rotatable parts of the shock absorber, reducing wear and permitting the accurate and gradual dampening of shocks.

In the operation of a device of this character, it is evident that the relative motion between the axle and the vehicle frame causes the connecting rod 60 to impart an oscillatory or rotary motion to shell 10. The latter not only is rotatably supported upon the inner flange or boss 11, but it also bears lightly through the friction lining 14 upon the flange 7. When minor movement of the axle in relation to the frame is taking place, the balls 18 are ordinarily engaging the flat portions 29 of the cam plate so that the shock absorbing device has substantially no retarding effect upon the action of the leaf spring. As the frame approaches the axle or goes further away from the same the balls engage either cam surfaces 27 or 28, the former having a somewhat steeper pitch although both of these surfaces are comparatively gradual in their inclinations. Thus the tendency of the frame to move away from the axle may be more strongly opposed than relative movement of these members in the opposite direction, it being evident, however, that movement out of the normal range in either direction is opposed with progressively increasing resistance as the parts move a greater distance from their normal positions.

As the cam plate is rotated due to the rotation of shell 10 so that the balls 18 are engaging the cam surfaces, the central portion of the spring plate 16 tends to be pressed outwardly due to the engagement of the screw 16 with the central portion of cam plate 26. A portion of this outward movement is imparted to the shell 10 and to the friction material 14 carried by the same so that the surfaces of elements 14 and 7 are brought into firm engagement to oppose relative movement of the inner and outer clutch members, a slight lateral movement of bearing 11 permitting this action. Thus the movement of the frame and axle in relation to each other is progressively opposed and retarded as the parts move out of their normal position, due to the arrangement of the cam plate 26 and due to the arrangement of the inner and outer friction members to simulate a cone clutch or brake. A quite limited lateral movement of shell 10 is sufficient to permit a wide variation in the intensity of frictional engagement. It is furthermore evident that the adjusting screw 38 may be manipulated not only to alter the initial relation of the parts but to compensate for wear of the friction lining 14. It is also apparent that the relatively moving surfaces are enclosed and protected from the intrusion of moisture, dust and the like, and the consequent deterioration or wear and that the parts of this device may in general be inexpensively formed out of sheet metal stampings and the like.

I claim:

1. A shock absorber comprising a pair of relatively rotatable members, one of the same forming a shell and substantially enclosing the other, mutually engageable surfaces upon said members, said engaging surfaces having a frusto-conical shape, cam means to press the same into engagement, a support for the enclosed member extending through the shell and concentric with axis of relative rotation of said members, and means for connecting the shell to part of the vehicle.

2. A shock absorber comprising a pair of relatively rotatable members, one of the same forming a shell and substantially enclosing the other, mutually engageable friction surfaces upon said members and lining material carried by one of said members to form its friction surface, said engaging surfaces having a frusto-conical shape, cam means to press the same into engagement, said shell including a resilient disk, said disk serving to press the cam means inwardly so that the friction surfaces are urged toward each other, a support for the enclosed member extending through the shell and concentric with the axis of relative rotation of said members, and means for connecting the shell to part of the vehicle.

3. A shock absorber comprising a pair of relatively rotatable members, mutually engageable surfaces upon said members, cam means to press the same into engagement, a spring arranged to press the cam means inwardly whereby the friction surfaces may be urged toward each other, said cam means having spaced opposed rise portions and a flat portion therebetween, one of the relatively rotatable members carrying anti-friction elements engageable with said portions of the cam means, and means for connecting the relatively rotatable parts respectively to relatively movable parts of the vehicle.

4. A shock absorber comprising a pair of relatively rotatable members, one of the same forming a shell and substantially enclosing the other, mutually engageable surfaces upon said members, said engaging surfaces having a frusto-conical shape, cam means to press the same into engagement, said shell including a resilient disk, said disk being arranged to press the cam means inwardly so that the friction surfaces may be urged toward each other, said cam means having opposed rise portions and a flat portion therebetween, one of said rises having a sharper inclination than the other.

5. A shock absorber comprising a pair of relatively rotatable members, one of the same forming a shell and substantially enclosing the other, mutually engageable friction surfaces upon said members and lining material carried by the shell member to provide the friction surface, said engaging surfaces having a frusto-conical shape and cam means to press the same into engagement, said material upon the shell being arranged upon an outer wall thereof to facilitate cooling, a support for the enclosed member extending through the shell and concentric with axis of relative rotation of said members, and means for connecting the shell to another part of the vehicle.

6. A shock absorber comprising a pair of relatively rotatable members, one of the same forming a shell and substantially enclosing the other, mutually engageable surfaces upon said members, said engaging surfaces having a frusto-conical shape, cam means to press the same into engagement, said shell including a resilient disk, said disk serving to press the cam means inwardly so that the friction surfaces are urged toward each other, an adjustable connection between the disk and cam means whereby the resistance of the friction surfaces to relative movement of the members may be varied, a support for the enclosed member extending through the shell and concentric with axis of relative rotation of said members, and means for connecting the shell to another part of the vehicle.

7. A shock absorber comprising a pair of relatively rotatable members, one of the same forming a shell and substantially enclosing the other, mutually engageable friction surfaces upon said members and lining material carried by one of said members to provide its friction surface, said engaging surfaces having a frusto-conical shape, cam means to press the same into engagement, said shell including a resilient disk, said disk serving to press the cam means inwardly so that the friction surfaces are urged toward each other, said cam means having spaced opposed rise portions and a flat portion therebetween, said enclosed member carrying anti-friction elements engageable with said portions of the cam means, a support for the enclosed member extending through the shell and concentric with axis of relative rotation of said members, and means for connecting the shell to another part of the vehicle.

8. A shock absorber comprising a pair of relatively rotatable members, one of the same forming a shell and substantially enclosing the other, mutually engageable surfaces upon said members, cam means to press the same into engagement, said shell including a resilient disk, said disk serving to press the cam means inwardly so that the friction surfaces are urged toward each other, an adjustable threaded connection between the disk and cam means whereby the resistance of the friction surfaces to relative movement of the members may be varied, a resilient member normally locking the connection against movement, but being manually depressible to permit adjustment of the same, said connection and resilient member being accessible from the exterior of the shell.

9. A shock absorbing device comprising a circular casing having one end closed and an axial opening in the other end, a shaft journaled in said opening with its end presented to the interior of the casing, a thrust member fast to said end of the shaft with a friction surface bearing against a friction surface on the casing, and resilient means including a cam inside the casing for gradually increasing the pressure between said friction surfaces in response to relative rotation between the casing and shaft in either direction from a neutral position.

10. A shock absorbing device comprising a circular casing having one end closed and an axial opening in the other end, a shaft journaled in said opening with its end presented to the interior of the casing, flexible means for sealing the joint between said casing and shaft, a thrust member fast to said end of the shaft with a friction surface bearing against a friction surface on the casing, and resilient means including a cam inside the casing for gradually increasing the pressure between said friction surfaces in response to relative rotation between the casing and shaft in either direction from a neutral position.

Signed by me at Boston, Massachusetts, this 19th day of May, 1928.

WEBSTER JONES.